(12) United States Patent
Arakawa et al.

(10) Patent No.: US 6,894,863 B2
(45) Date of Patent: May 17, 2005

(54) METHOD AND APPARATUS FOR ACCESS CONTROL IN A DISK DRIVE

(75) Inventors: Yutaka Arakawa, Ome (JP); Akio Mizuno, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 323 days.

(21) Appl. No.: 10/234,234

(22) Filed: Sep. 5, 2002

(65) Prior Publication Data

US 2003/0123183 A1 Jul. 3, 2003

(30) Foreign Application Priority Data

Dec. 27, 2001 (JP) ........................................ 2001-398172

(51) Int. Cl.⁷ .............................................. G11B 5/55
(52) U.S. Cl. .................................. 360/78.04; 711/204
(58) Field of Search .............................. 360/78.04, 75, 360/78.14; 711/4, 111, 112, 113, 204

(56) References Cited

U.S. PATENT DOCUMENTS

| | | | | |
|---|---|---|---|---|
| 5,765,213 A | * | 6/1998 | Ofer .......................... | 711/213 |
| 6,038,096 A | | 3/2000 | Zhang et al. ............ | 360/78.04 |
| 6,092,145 A | * | 7/2000 | Kigami et al. ............... | 711/111 |
| 6,260,108 B1 | * | 7/2001 | Barve et al. ................. | 711/113 |
| 6,310,743 B1 | * | 10/2001 | Haines et al. ................ | 711/113 |
| 6,311,256 B2 | | 10/2001 | Halligan et al. | |
| 6,339,811 B1 | * | 1/2002 | Gaertner et al. ............ | 711/112 |
| 6,553,476 B1 | * | 4/2003 | Ayaki et al. ................. | 711/204 |
| 6,564,292 B2 | * | 5/2003 | Wei Loon et al. .......... | 711/113 |

FOREIGN PATENT DOCUMENTS

| | | |
|---|---|---|
| JP | 6-12188 | 1/1994 |
| WO | WO 00/63907 | 10/2000 |

* cited by examiner

Primary Examiner—Sinh Tran
Assistant Examiner—James L Habermehl
(74) Attorney, Agent, or Firm—Pillsbury Winthrop, LLP (57) ABSTRACT

Disclosed is a method of access control for a disk drive whereby an access operation for, particularly, sequentially and alternately executing accesses is supported. A CPU of the present disk drive sequentially and alternately executes accesses to a plurality of data tracks on a disk in response to an access request generated from a host system. During the access operation, the CPU secures time for a look-ahead operation, the time corresponding to the difference between transfer rates. Thus, sequential and alternate access operation in which the number of seek operations can be reduced can be realized.

2 Claims, 8 Drawing Sheets

METHOD AND APPARATUS FOR ACCESS CONTROL IN A DISK DRIVE

CROSS-REFERENCE TO RELATED APPLICATIONS

This application is based upon and claims the benefit of priority from the prior Japanese Patent Application No. 2001-398172, filed Dec. 27, 2001, the entire contents of which are incorporated herein by reference.

BACKGROUND OF THE INVENTION

1. Field of the Invention

The present invention generally relates to the field of a disk drive such as a hard disk drive, and more particularly to the improvement of an access control method for continuously accessing data from a plurality of data tracks on a disk medium.

2. Description of the Related Art

In recent years, disk drives such as hard disk drives have been used as storage devices for storing audio data and video data (generally called AV data) in addition to computer data. A host system such as a personal computer or a digital television set accesses AV data stored in a disk drive through an image recording operation or a sound recording operation and then permits a playback system such as through a display or a speaker to reproduce the data.

Unlike computer data, AV data requires continuous processing. Accordingly, an access operation for AV data has the following characteristics: First, in accessing AV data, higher priority is given to maintaining an arbitrary transfer rate in accordance with the amount of data of, e.g., images or sounds than increasing the accuracy of the data. In order to maintain the transfer rate, the host system sets an arbitrary time limit for access to the disk drive. In the disk drive, an access process is completed within the time limit, thereby maintaining the transfer rate.

Upon accessing AV data, AV data is successively recorded to sequential addresses on a disk recording medium (hereinbelow, simply referred to as a disk), or AV data is successively reproduced from the disk. In this case, an access operation where previously recorded AV data is reproduced from a data track while other AV data is being recorded to another data track designated on the disk is often carried out. In the access operation, a particular access with respect to recording or reproducing is not preferentially executed. Both of the accesses for recording and reproducing are alternately executed.

Generally, the disk drive executes the foregoing access operation in response to a request (a command generated) from the host system. However, when only the access operation is performed in accordance with the request from the host system, the performance of data transfer to/from the host system is degraded. The reason is as follows. Specifically, in the disk drive, the access operation for recording or reproducing designated data to/from the disk requires processing time (namely, the time required for preparation processing) for the seek operation of the head, which is not concerned with data transfer.

General disk drives use a method for continuous access to sequential data between the accesses of data requested from the host system. In the access operation during reproduction, after requested data on the disk is accessed, a look-ahead operation to continuously access data from consecutive data sectors following the sector of the requested data is executed. On the other hand, in the access operation during recording, a write operation to continuously write requested data (write data), which is transferred from the host system to a buffer memory in the drive, to consecutive data sectors is executed.

The above method is effectively used to increase the performance of data transfer (in some cases, called host transfer) to/from the host system. However, in the above-mentioned alternate access operation, when the sequential access operations are alternately executed to the data tracks, a situation where the look-ahead operation upon reproduction is hardly executed occurs. Therefore, when the usual continuous access method is used, the performance of the host transfer cannot always be increased in the alternate access operation upon reproducing AV data.

In the general disk drive, when the continuous access method is used and the look-ahead operation is executed in the access operation during reproduction, the performance of the host transfer can be increased. However, as mentioned above, in the access operation to sequentially and alternately access data upon, particularly, reproducing AV data, the look-ahead operation upon reproduction is hardly executed due to influences of the number of seek operations of a head to the data tracks having different access targets and the rotation waiting time of the disk. Accordingly, the performance of the host transfer cannot always be increased. As related art, methods for performing each access in a minimum time in the access operation for sequentially and alternately executing accesses have been proposed (for example, refer to Jpn. Pat. Appln. KOKAI Publication No. 6-12188). However, in the related art, such a situation that the look-ahead operation cannot be executed is not overcome. Therefore, the performance of the host transfer cannot be increased.

BRIEF SUMMARY OF THE INVENTION

It is an object of the present invention to provide a disk drive access method whereby the performance of host transfer is increased to improve the entire access operation upon executing an access operation to sequentially and alternately execute accesses.

In accordance with one aspect of the present invention, there is provided a method of access control for a disk drive which includes a disk medium and a head for accessing data from data tracks on the disk medium, wherein when the disk drive sequentially alternately accesses data in the data tracks on the disk medium, a look-ahead operation can be secured and the number of seek operations can be reduced.

The method comprises the steps of: accessing look-ahead data other than requested data when alternately and sequentially accessing the requested data from the data tracks on the disk medium in association with movement of the head; accumulating the requested data and the look-ahead data in a buffer memory; and securing access time to access the look-ahead data from a data track having a high data transfer rate on the basis of a difference between data transfer rates of the data tracks for a predetermined period.

DETAILED DESCRIPTION OF THE INVENTION

Embodiments of the present invention will now be described hereinbelow with reference to the drawings.

First Embodiment

Figure 1:
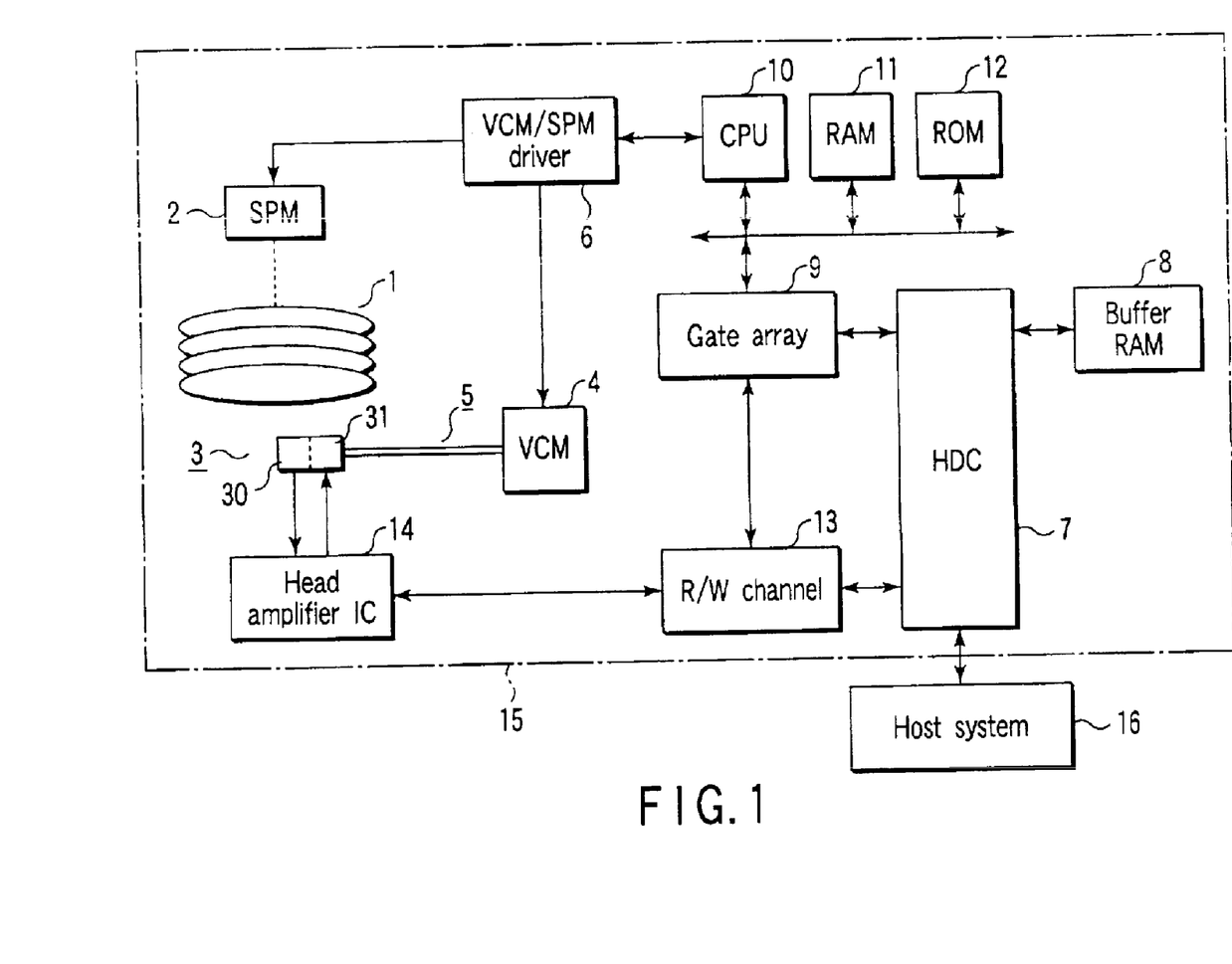
FIG. 1 is a block diagram showing an essential part of a disk drive according to first and second embodiments of the present invention.

According to the present embodiment, as shown in FIG. 1, a disk drive 15 has a mechanism that accesses a disk 1 serving as a recording medium in accordance with a read/write command generated from a host system 16 to execute recording or reproducing of data.

In an access operation according to the present embodiment, disk access (DA) to access a data track on the disk 1 is discriminated from access to a buffer memory (buffer RAM) 8. The host system 16 is a digital device such as a personal computer or a digital television set.

One or a plurality of disks 1 are attached to a spindle motor (SPM) 2 and are then rotated. In the disk 1, a plurality of concentric data tracks are formed. Each data track is divided into a plurality of data sectors.

In the access operation, a head (in this case, a magnetic head) 3 records data in units of data sectors on each data track or reproduces data from each data sector. The head 3 has a read head 30 to reproduce data (a read operation) and a write head 31 to record data (a write operation).

The head 3 is mounted on an actuator 5 including a voice coil motor (VCM) 4. The actuator 5 executes the seek operation to move the head 3 in the radial direction of the disk 1 by a driving force of the VCM 4.

Each of the SPM 2 and the VCM 4 is supplied with driving current from a motor driver IC 6 constructed by integrating an SPM driver and a VCM driver into one circuit. A CPU 10 controls the motor driver IC 6. The CPU 10 is the main control unit of the drive and executes the control operation on the basis of a program stored in a ROM 12. A RAM 11 is used as a working memory in the control operation of the CPU 10.

The disk drive 15 further comprises a disk controller (HDC) 7, buffer memory (buffer RAM) 8, gate array 9, read/write (R/W) channel 13, and head amplifier (preamplifier) IC 14.

The HDC 7 comprises an interface of the drive 15 and the host system 16. The HDC 7 receives a command from the host system 16 and controls transfer of read/write data. The buffer memory 8 temporarily stores read data (reproduced data) and write data (recording data) transferred from the HDC 7. Look-ahead data in a look-ahead operation according to the present embodiment is accumulated in the buffer memory 8.

The gate array 9 includes a servo controller for reproducing servo data and an interface controller for transmitting or receiving various data and signals. The R/W channel 13 is a read/write signal processing circuit. The R/W channel 13 reproduces (decodes) a read signal read out by the read head 30 through the head amplifier IC 14 into original recording data, and then transmits the reproduced data (digital read data) to the HDC 7. The R/W channel 13 receives write data from the HDC 7, encodes the data into predetermined recording data, and then transmits the resultant data to the head amplifier IC 14.

The head amplifier IC 14 has a read amplifier for amplifying the read signal supplied from the read head 30 and a write amplifier for converting the encoded data supplied from the R/W channel 13 into write current.

Access Operation

The access operation according to the present embodiment will now be described with reference to FIGS. 1 to 6.

Figure 2A:
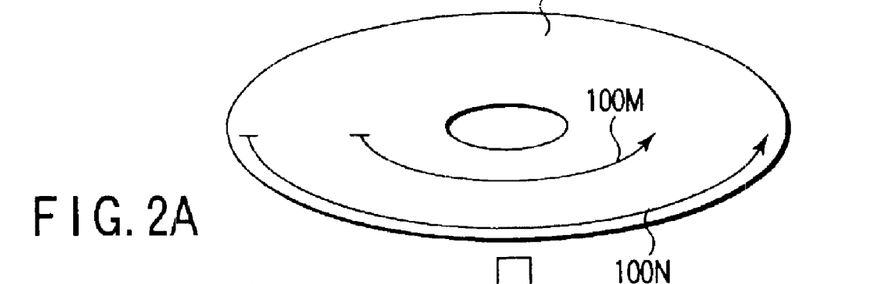
FIGS. 2A and 2B are diagrams for explaining data transfer rates in disk access according to the first and second embodiments.

In the present embodiment, the access operation for reproduction is assumed. In the access operation, for example, AV data recorded on the disk 1 is accessed in response to an access request generated from the host system 16. In this instance, as shown in FIG. 2A, an inner data track 100M and an outer data track 100N on the disk 1 are alternately and sequentially accessed.

In a general disk drive, each data track on the disk 1 is divided into a plurality of data sectors 200N or 200M. In other words, in the access operation, recording or reproducing data is executed in units of data sectors.

Figure 2B:
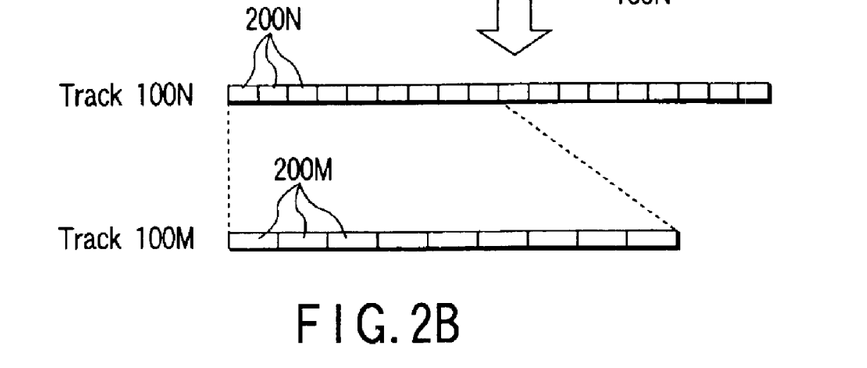

As shown in FIG. 2B, the number of data sectors included in the inner data track 100M on the disk 1 is different from that in the outer data track 100N. That is, the outer data track 100N includes data sectors whose number is relatively larger than that of the inner data track 100M. In the access operation, a transfer rate (the amount of data per unit time) of data accessed in the outer data track 100N is higher than that in the inner data track 100M.

Figure 3:
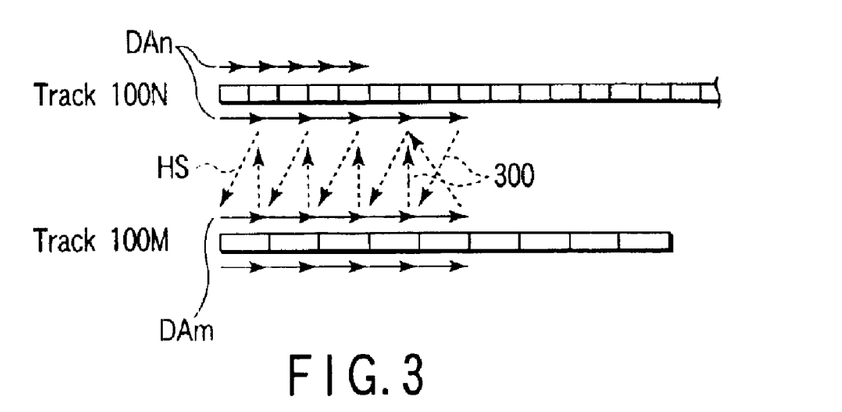
FIG. 3 is a diagram for explaining an outline of an access operation according to the first and second embodiments.

According to the present embodiment, as shown in FIG. 3, the disk drive 15 alternately and sequentially accesses the data tracks 100M and 100N on the disk 1, and then transfers data read from the data tracks 100M and 100N to the host system 16. The access operation is accompanied by the seek operation (HS) to move the head 3 between the data tracks 100M and 100N. During the seek operation (HS), disk accesses (DAm) and (DAn) to the data tracks 100M and 100N are stopped.

The look-ahead operation cannot be executed by only the disk access according to the access request supplied from the host system 16. Accordingly, look-ahead data is hardly accumulated in the buffer memory 8.

According to the access method of the present embodiment, the look-ahead operation for the outer data track 100N having a high transfer rate is preferentially executed using the difference between the transfer rates of the data tracks 100M and 100N as mentioned above. As a result, parts (300) of the seek operation are cut to reduce the number of seek operations. Consequently, the performance of the entire access operation is increased.

In this instance, since the transfer rate of the data track 100M is different from that of the data track 100N, time required for disk access in the data track 100M is also different from that in the data track 100N. According to the access method of the present embodiment, the look-ahead operation for the outer data track 100N is preferentially executed for the time difference between the disk accesses.

Figure 5:
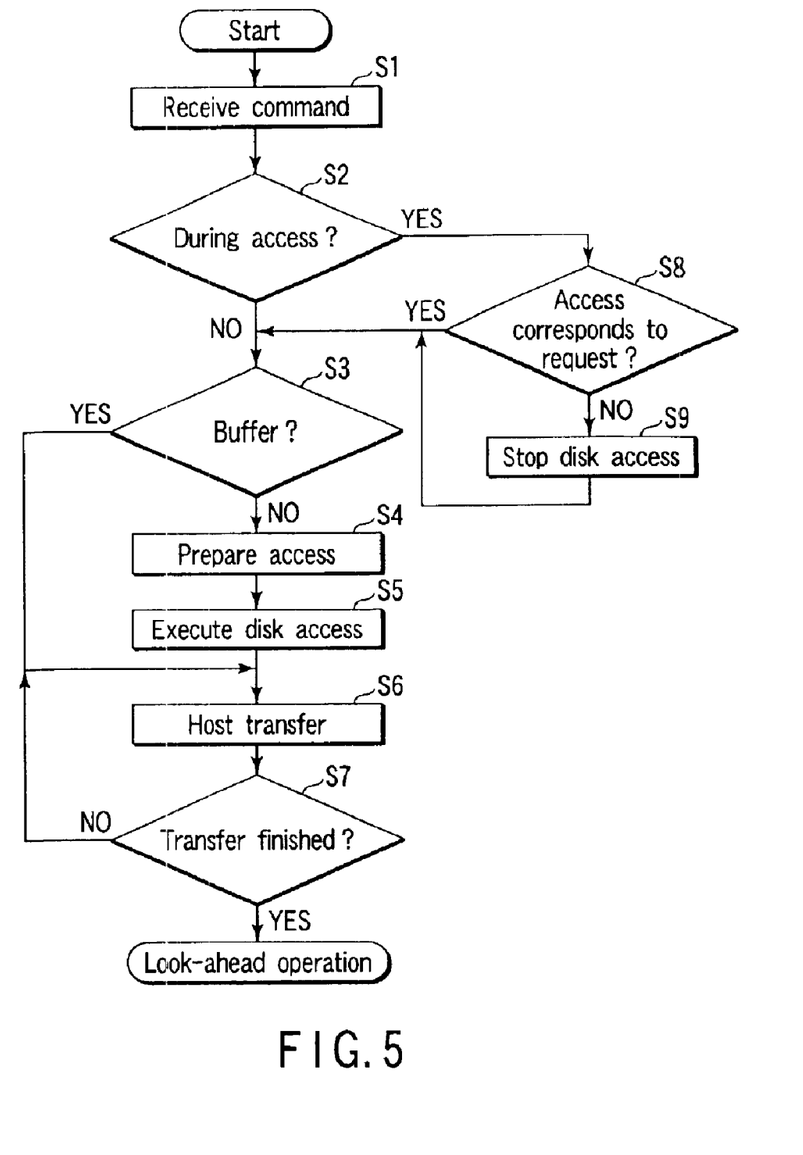
FIG. 5 is a flowchart for explaining a procedure of an access method according to the first embodiment.
Figure 6:
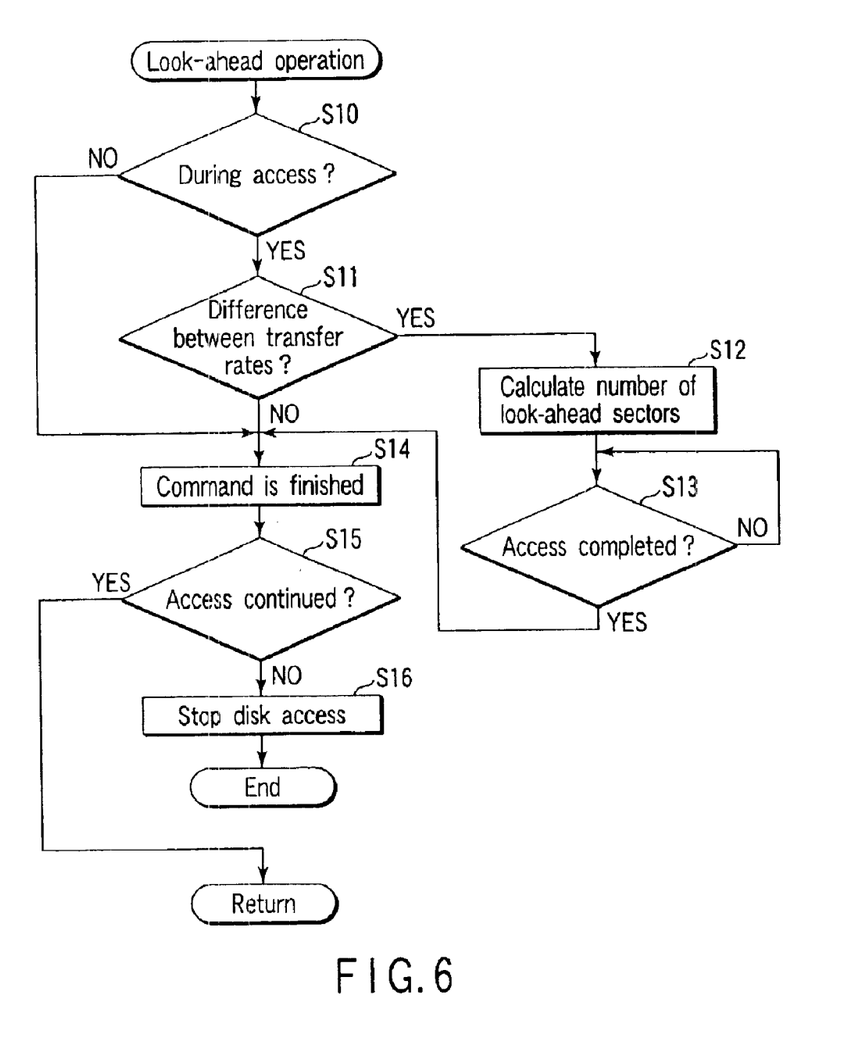
FIG. 6 is a flowchart for explaining the procedure of the access method according to the first embodiment.

The access method according to the present embodiment will now be described in detail with reference to FIGS. 4 to 6.

Figure 4:
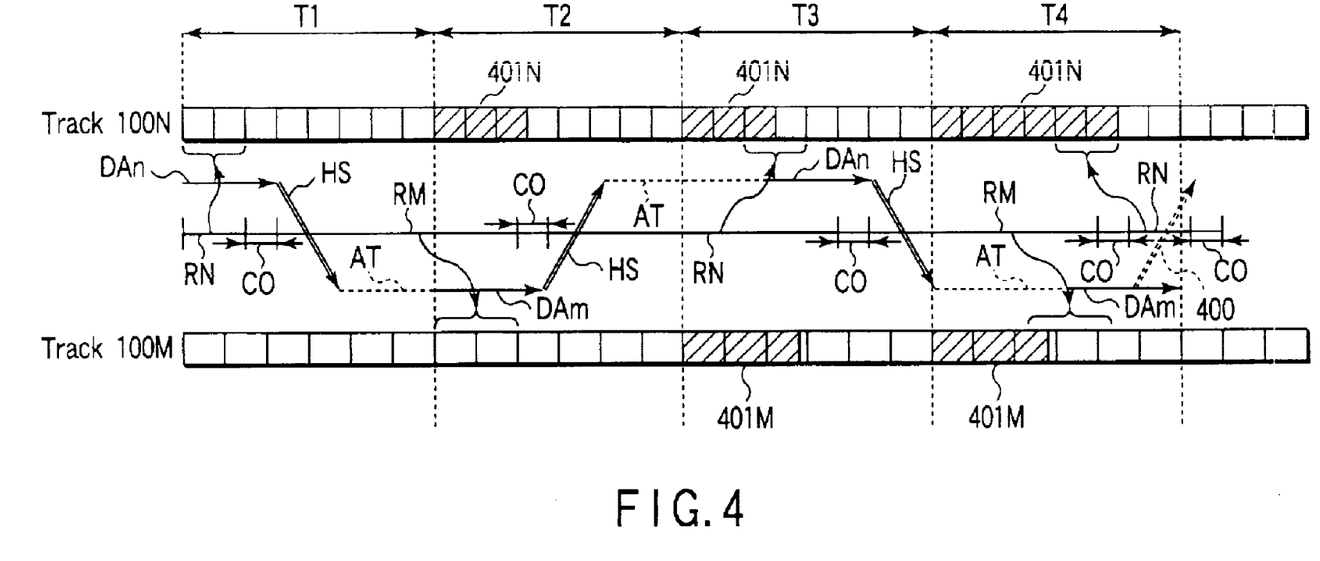
FIG. 4 is a timing chart for explaining the access operation according to the first embodiment.

Referring to FIG. 4, reference symbols T1 to T4 denote periods each corresponding to one rotation of the disk 1; DAn, the disk access to the data track 100N; DAm, the disk access to the data track 100M; RN, host processing (such as command generation processing) for the data track 100N; RM, host processing for the data track 100M; CO, access preparation processing (command overhead); and HS, the seek operation of the head 3. Reference numeral 400 denotes the seek operation to be cut; 401N, data read from the data track 100N; and 401M, data read from the data track 100M. Reference symbol AT denotes standby time of the disk access.

Basic Operation

When a command indicative of an access request is generated from the host system 16, the HDC 7 in the disk drive 15 receives the command (step S1). The CPU 10 interprets the command received by the HDC 7. In this instance, a read command to reproduce data from the data tracks (100M and 100N) on the disk 1 is assumed. Usually, the CPU 10 executes the seek operation to position the head 3 on the data track where data corresponding to the access request has been recorded. Specifically, the CPU 10 permits the motor driver 6 to drive the VCM 4, thereby moving the head 3 to the data track serving as a target position on the disk 1.

In this case, the read head 30 included in the head 3 reads recorded data from the data track and then outputs the data to the head amplifier IC 14. The R/W channel 13 performs signal processing (such as decoding) of the read signal transmitted from the head amplifier IC 14 to reconstitute original data and then transmits the reconstituted data to the HDC 7.

The HDC 7 accumulates reproduced data (read data) supplied from the R/W channel 13 in the buffer memory 8 and also transfers the data to the host system 16.

The above-mentioned basic operation is used as a precondition. When the HDC 7 receives a command from the host system 16 (step S1), the CPU 10 determines whether disk access (the read operation by the read head 30) is being executed (step S2).

If the disk access is being executed (YES in step S2), the CPU 10 determines whether the disk access is stopped (step S8). In other words, when the disk access is performed for a data track which is not concerned with the access request supplied from the host system 16 (NO in step S8), the CPU 10 stops the disk access (step S9).

When data requested by the host system 16 is accumulated in the buffer memory 8 (YES in step S3), the CPU 10 transfers the requested data from the HDC 7 to the host system 16 without executing the disk access (step S6). When the requested data is not accumulated in the buffer memory 8 (NO in step S3), the CPU 10 proceeds to preparation for the execution of disk access to the requested data (step S4).

When the CPU 10 completes the preparation for address setting of requested data or the seek operation of the head 3, the CPU 10 permits the read head 30 to execute the disk access (step S5). When the disk access is executed, as mentioned above, the HDC 7 accumulates reproduced data (requested data) supplied from the R/W channel 13 in the buffer memory 8 and also transfers the data to the host system 16 (steps S6 and S7).

The above-mentioned operation which accompanies the execution of the disk access will now be described with reference to a timing chart of FIG. 4.

First, for the period T1 in FIG. 4, for example, the disk access (DAn) to the data track 100N is executed in response to the host request (RN). Due to the disk access (DAn), data (of two sectors in this case) recorded in the data track 100N is transferred to the host system 16. When all of the data is transferred to the host, the host processing (RN) is finished.

When the host processing is completed, the host system 16 proceeds to preparation for generation of the next command (CO: command overhead). During the period for preparation, the disk access (DAn) to the data track 100N is continued (the look-ahead operation). Data read by the look-ahead operation is transmitted to the HDC 7 and is then accumulated in the buffer memory 8.

Subsequently, when a command for the data track 100M is generated by the host processing (RM), the CPU 10 stops the disk access (DAn) to the data track 100N and then executes the seek operation (HS) of the head 3. The disk access cannot be executed entirely until the seek operation (HS) is completed and the head 3 reaches the data track 100M.

When the head 3 reaches the data track 100M, the CPU 10 executes the disk access (DAm) to the data track 100M after the standby time AT (waiting for rotation) for the disk access (period T2). As with the foregoing period T1, the disk access (DAm) is continued until the next host request (RN) is generated. Consequently, requested data and look-ahead data read by the disk access (DAm) are transmitted to the HDC 7 and are then accumulated in the buffer memory 8. The requested data is transferred from the HDC 7 to the host system 16.

As mentioned above, in response to the host request (RN or RM), the disk accesses (DAn and DAm) to the data tracks 100N and 100M are alternately executed while being accompanied with the seek operation of the head 3. The requested data read from the disk accesses (DAn and DAm) is transferred to the host system 16 through the HDC 7 (host transfer).

The look-ahead operation which is executed after the host transfer will now be described with reference to a flowchart of FIG. 6.

For the period T2 in FIG. 4, when the next host request (RN) is generated, the CPU 10 executes the disk access (DAn) to the data track 100N (for the period T3). In this instance, it is assumed that requested data (401N) corresponding to the host request (RN) has been accumulated in the buffer memory 8 by the preceding disk access. In this case, the HDC 7 transfers the requested data (401N) read from the buffer memory 8 to the host system 16.

After the host transfer, the CPU 10 determines whether the disk access (DAn) to the data track 100N is continued (step S10). In other words, the CPU 10 determines whether the look-ahead operation is executed until the next host request (RN) is generated. In this case, it is assumed that the look-ahead operation, namely, the disk access (DAn) is continued (YES in step S10).

In this instance, the CPU 10 determines whether there is a difference between the disk transfer rate of the immediately preceding command (RM) and that of the present command (RN) (step S11). In this case, since the inner data track 100M having a relatively low transfer rate and the outer data track 100N having a relatively high transfer rate are alternately accessed, there is a difference between the disk transfer rates.

The CPU 10 calculates the number of data sectors corresponding to the difference between the transfer rates (step S12). The CPU 10 continues the disk access (DAn) corresponding to the look-ahead operation of the calculated number of data sectors (refer to the period T3). When the disk access (DAn) is completed (YES in step S13), the command is finished (step S14).

Further, the CPU 10 determines on the basis of the generation of the next host request (RM) whether the disk access (DAn) is continued (step S15). When the next host request (RM) is generated (NO in step S15), the disk access (DAn) is stopped (step S16).

As mentioned above, when the data track 100N having a high transfer rate is accessed, the look-ahead operation is executed for a period corresponding to the difference between the high transfer rate and a low disk-transfer rate corresponding to the preceding command (RM). Therefore, although the completion of the host processing (RN) is slightly delayed, look-ahead data can be maintained sufficiently in the buffer memory 8.

Subsequently, when the command for the data track 100M is generated by the host processing (RM), the CPU 10 executes the seek operation (HS) to move the head 3 from the data track 100N to the data track 100M.

In this instance, since the part of requested data corresponding to the host request has been accumulated in, for example, the buffer memory 8, the actual disk access (DAm) is finished in a short time (refer to the period T4). The transfer rate of the data track 100M is low. Accordingly, when the requested data corresponding to the host request is transferred to the host system 16, the host processing is completed in minimum time (one rotation time).

Subsequently, when a command for the data track 100N is generated by the host processing (RN), the requested data is included in the look-ahead data (401N) accumulated in the buffer memory 8 by the look-ahead operation for the period T3. Therefore, the CPU 10 does not need the seek operation (400) to move the head 3 to the data track 100N. The requested data is read from the look-ahead data (401N) accumulated in the buffer memory 8 by the HDC7 and is then transferred to the host system 16.

Accordingly, since the seek operation and the disk access are not needed, the host processing (RN) is completed in a very short time. Since the seek operation (400) is unnecessary for the period of the host processing (RN), the CPU 10 executes the look-ahead operation while continuing the disk access (DAm) to the data track 100M.

Advantages

As mentioned above, the disk access (DAn) to the data track 100N having a high transfer rate is continued for a period corresponding to the difference between the transfer rates, in other words, for a period corresponding to the disk access (DAm) to the data track 100M having a low transfer rate. Consequently, although time required for the host processing is slightly delayed, requested data included in data to be sequential accessed in the data track 100N can be obtained before the look-ahead operation.

In other words, in the sequential and alternate access operation, time for the look-ahead operation in the data track 100N having a high transfer rate can be secured. Therefore, when the host request for the data track 100N is generated, the requested data can be read from the look-ahead data accumulated in the buffer memory 8 and be then transferred without needing the seek operation and the disk access. Consequently, the entire execution time required for host processing (RM and RN) can be reduced. Thus, the performance of the sequential and alternate access operation can be increased.

The advantages of the present embodiment will now be described hereinbelow with respect to a specific example.

In the sequential and alternate access operations for the data tracks 100M and 100N, it is assumed that, for access time of the same amount of requested data, the ratio of access time for the data track 100M to that for the data track 100N is 1:1.2 (5 ms:6 ms with respect to access to 256 sectors). When the time required for the seek operation (HS) is set to 13 ms, it is assumed that there is a difference between the transfer rates corresponding to 51 data sectors.

Subsequently, in the access to the data track 100N, the completion of the command is repetitively delayed until the look-ahead operation for 51 sectors is finished. One host request is satisfied by data obtained by the sixth repetitive delaying operation and data accumulated in the buffer memory 8 for six repeated operations can be secured. Accordingly, in the access to the data track 100N, the look-ahead operation is advanced by 6 ms (1 ms×six times). Consequently, the processing time corresponding to the seek time (13 ms×2) can be reduced in the seek operation required to move the head between the data tracks 100M and 100N.

Second Embodiment

Generally, when AV data or the like is reproduced, the host system 16 sets a time limit of access to each of the data tracks 100M and 100N in order to maintain the transfer rate. A second embodiment relates to an access method whereby the maximum command processing time is secured in the time limit to continue disk access. Specifically, according to the access method, after a host request is completed, the look-ahead operation is continued until the access time limit, thereby securing the maximum amount of look-ahead data.

The present embodiment will now be described in detail hereinbelow with reference to FIGS. 7 to 9.

Figure 8:
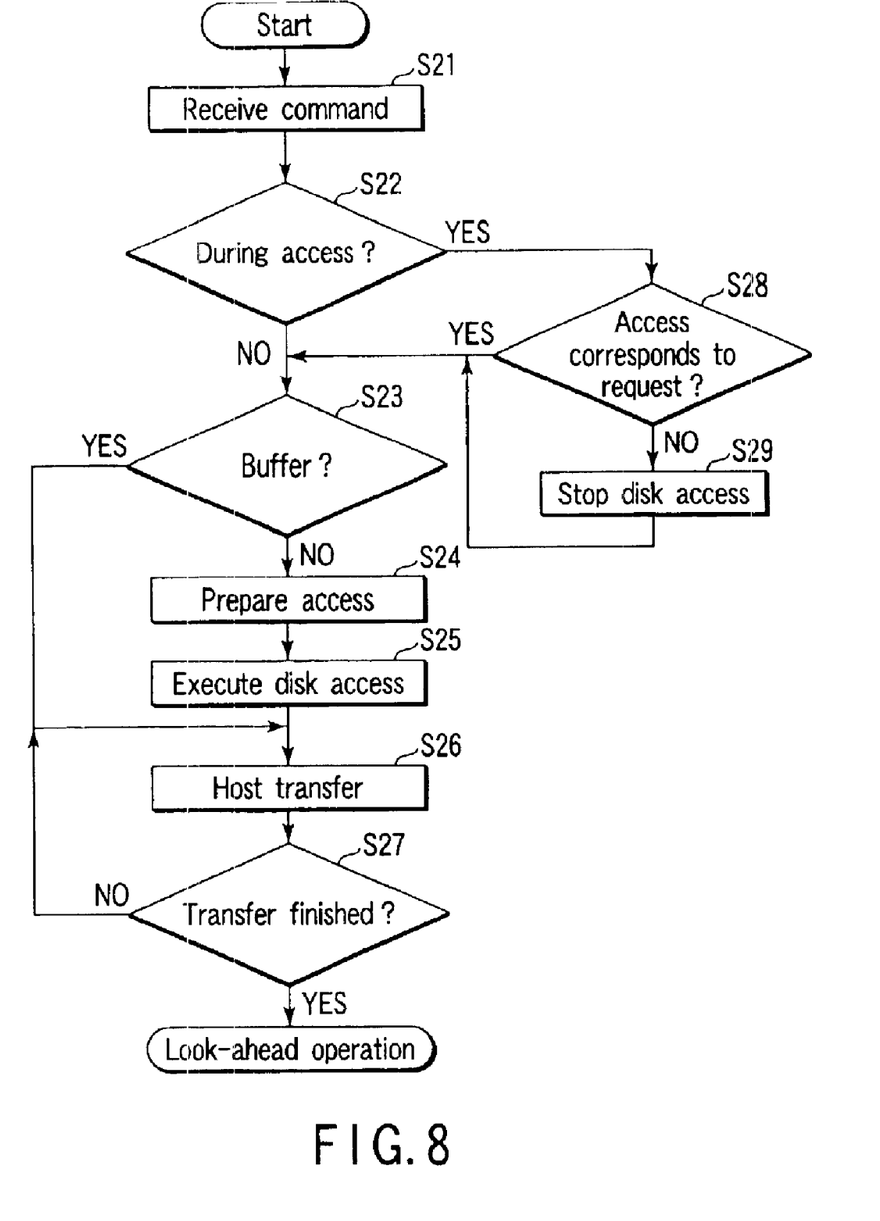
FIG. 8 is a flowchart for explaining a procedure of an access method according to the second embodiment.
Figure 9:
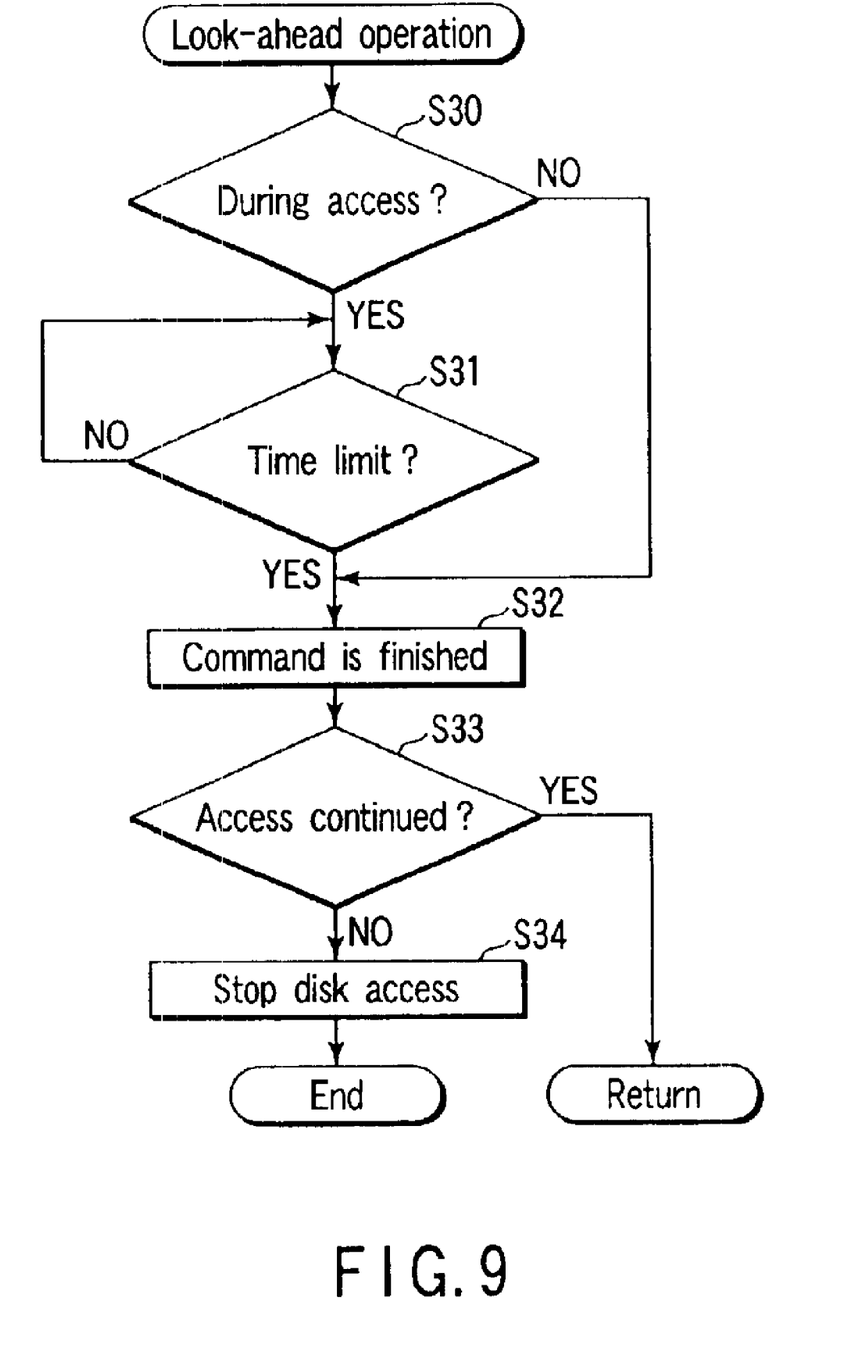
FIG. 9 is a flowchart for explaining the procedure of the access method according to the second embodiment.

As shown in a flowchart of FIG. 8, when the HDC 7 receives a command from the host system 16 (step S21), the CPU 10 determines whether disk access (the read operation by the read head 30) is being executed (step S22).

If the disk access is being executed (YES in step S22), the CPU 10 determines whether the disk access is stopped (step S28). In other words, if the disk access is performed for a data track which is not concerned with the access request of the host system 16 (NO in step S28), the CPU 10 stops the disk access (step S29).

In the case where data requested by the host system 16 has been accumulated in the buffer memory 8 (YES in step S23), the CPU 10 permits the HDC 7 to transfer the requested data to the host system 16 (step S26). If the requested data is not accumulated in the buffer memory 8 (NO in step S23), the CPU 10 proceeds to preparation for the execution of disk access for the requested data (step S24).

When the preparation for address setting of the requested data and the seek operation of the head 3 is completed, the CPU 10 executes disk access using the read head 30 (step S25). Due to the execution of the disk access, as mentioned above, the HDC 7 accumulates reproduced data (requested data) supplied from the R/W channel 13 in the buffer memory 8 (step S26) and also transfers the data to the host system 16 (step S27).

The above-mentioned operation accompanying the execution of the disk access will now be described with reference to a timing chart of FIG. 7.

Figure 7:
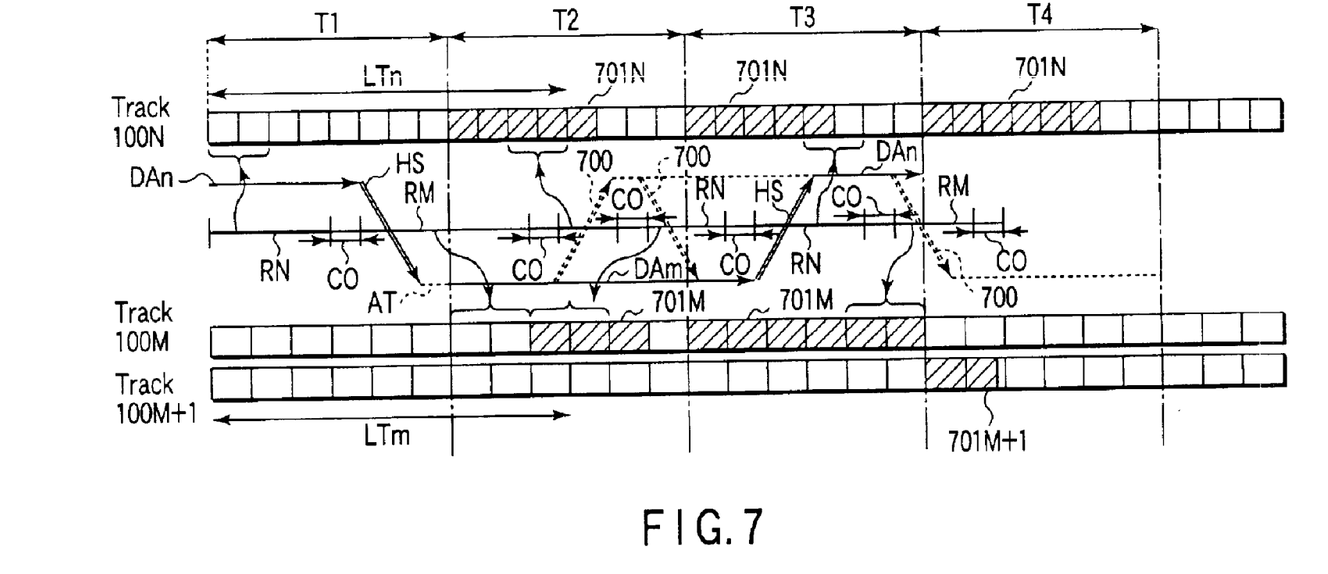
FIG. 7 is a timing chart for explaining the access operation according to the second embodiment.

First, for the period T1 in FIG. 7, the disk access (DAn) to, e.g., the data track 100N is executed in response to the host request (RN). Due to the disk access (DAn), data (of two sectors in this case) recorded in the data track 100N is transferred to the host system 16. When all of the data is transferred to the host system 16, the host processing (RN) is finished.

When the host processing is finished, the host system 16 proceeds to preparation for generation of the next command (CO: command overhead). During such a preparation period, the disk access (DAn) to the data track 100N is continued (look-ahead operation). Data (701N) read by the look-ahead operation is transmitted to the HDC 7 and is then accumulated in the buffer memory 8.

Subsequently, when a command for the data track 100M is generated by the host processing (RM), the CPU 10 stops the disk access (DAn) to the data track 100N and then executes the seek operation (HS) of the head 3. The disk access cannot be executed until the seek operation (HS) is completed and the head 3 reaches the data track 100M.

When the head 3 reaches the data track 100M, the CPU 10 executes the disk access (DAm) to the data track 100M after the standby time AT (waiting for rotation) for the disk access (period T2).

The disk access (DAm) is continued until the next host request (RN) is generated in a manner similar to the foregoing period T1. Consequently, requested data and look-ahead data read by the disk access (DAm) are sent to the HDC 7 and then accumulated in the buffer memory 8. The requested data is transferred from the HDC 7 to the host system 16.

As mentioned above, the disk accesses (DAn and DAm) are alternately executed while being accompanied by the seek operation of the head 3 for the data tracks 100N and 100M in response to the host request (RN and RM). The requested data read by each disk access (DAn or DAm) is transferred to the host system 16 through the HDC 7 (host transfer).

According to the present embodiment, as shown in FIG. 7, the host system designates time limits (LTn and LTm) for the disk accesses executed for the data tracks 100N and 100M by the host system 16. When the elapsed time required for the actual disk access has spare time within the time limit (LTn or LTm), the look-ahead operation is continued for the spare time.

The look-ahead operation will now be described with reference to a flowchart of FIG. 9 in addition to FIG. 7.

For the period T1 shown in FIG. 7, after the host transfer, the CPU 10 determines whether the disk access (DAn) to the data track 100N is continued (step S30). In other words, whether the look-ahead operation is executed until the next host request (RM) is generated is determined. In this case, it is assumed that the look-ahead operation, namely, the disk access (DAn) is continued (YES in step S30).

The CPU 10 continues the look-ahead operation (disk access DAn) to the maximum limit up until the time limit (LTn) designated by the host system 16 (step S31). When the disk access (DAn) is completed (YES in step S31), the command is finished (step S32).

Further, the CPU 10 determines on the basis of the generation of the next host request (RM) whether the disk access (DAn) is continued (step S33). When the next host request (RM) is generated (NO in step S33), the disk access (DAn) is stopped (step S34).

As mentioned above, if the time limit (LTn or LTm) designated by the host system 16 has not been exceeded, the look-ahead operation is continued to the maximum limit after the host transfer. Accordingly, although the completion of the host processing (RN) is slightly delayed, look-ahead data can be sufficiently secured in the buffer memory 8.

Subsequently, as shown in FIG. 7, when a command for the data track 100M is generated by the host processing (RM), the CPU 10 stops the disk access (the look-ahead operation) to the data track 100N and then executes the seek operation (HS), thereby moving the head 3 from the data track 100N to the data track 100M.

The CPU 10 executes the disk access (DAm) for the data track 100M (period T2). Requested data read from the data track 100M due to the disk access (DAm) is transferred to the host system 16 through the HDC 7 (host transfer).

Subsequently, the command (RN) to the data track 100N is generated from the host system 16. The requested data is included the in look-ahead data (701N) accumulated in the buffer memory 8 by the look-ahead operation for the period T1. Therefore, a seek operation (700) to move the head 3 to the data track 100N is not needed. The HDC 7 reads out the requested data from the look-ahead data (701N) accumulated in the buffer memory 8 and then transfers the data to the host system 16.

Since the seek operation (700) and the stopping of the disk access (DAm) are not needed, the CPU 10 continues the disk access (DAm), thereby continuing the look-ahead operation in the data track 100M.

Subsequently, a command for the data track 100M is generated by the host processing (RM). The requested data is included in the look-ahead data (701M) accumulated in the buffer memory 8 by the look-ahead operation for the period T2. Therefore, the seek operation (700) to move the head 3 to the data track 100M is not needed. The HDC 7 reads out the requested data from the look-ahead data (701M) accumulated in the buffer memory 8 and then transfers the data to the host system 16.

Since the seek operation (700) and the stopping of the disk access (DAm) are unnecessary, the CPU 10 continues the disk access (DAm), thereby continuing the look-ahead operation for the data track 100M (period T3).

In a manner similar to the above, when a command for the data track 100N is generated by the host processing (RN), the CPU 10 stops the disk access to the data track 100M (the look-ahead operation) and executes the seek operation, thereby moving the head 3 from the data track 100M to the data track 100N (period T3). Then, the CPU 10 executes the disk access (DAn) to the data track 100N.

As mentioned above, when the disk access to the data track 100N or 100M is executed in response to the host request (RN or RM), the disk access is continued to the maximum limit up until the time limit (LTn or LTm) designated by the host system 16. Therefore, when the time limit (LTn or LTm) allows spare time after the requested data is transferred to the host system, the look-ahead operation in the data track is continued.

Consequently, although the time required for the host processing is slightly delayed within the time limit of the disk access, requested data included in data to be sequentially accessed can be secured before the look-ahead operation. Since the number of seek operations and the number of disk accesses can be reduced in the sequential and alternate access operation, the entire execution time required for host processing (RM and RN) can be reduced. Therefore, the performance of the entire access operation can be increased.

In case of the method according to the present embodiment, since the look-ahead operation is continued to the maximum limit up until the time limit, the host processing is relatively delayed. However, since the processing is performed without exceeding the time limit designated by the host system, a transfer rate requested by the host system can be guaranteed.

As mentioned above, according to the first and second embodiments, when continuous data such as AV data is sequentially and alternately accessed, the look-ahead operation is secured and the number of seek operations is reduced to increase the performance of the host transfer. Thus, the entire access operation can be improved.

In other words, the look-ahead operation can be surely executed during the access operation to sequentially and alternately execute the accesses. Therefore, an increase in the amount of look-ahead data can be realized, so that the possibility of transferring the look-ahead data as requested data to the host system can be increased.

What is claimed is:

1. A method of access control for a disk drive which includes a disk medium and a head for accessing data from data tracks on the disk medium, the method comprising:

accessing look-ahead data other than requested data when sequentially and alternately accessing the requested data in the data tracks on the disk medium in association with movement of the head;

accumulating the requested data and the look-ahead data in a buffer memory;

securing access time to access the look-ahead data for a predetermined period in addition to access time for the requested data within an access time limit of each data track; and setting the time required for disk access to each data track to the maximum limit within the data-track access time limit restricted by a host system.

2. A disk drive comprising:

a disk medium which has many concentric data tracks thereon;

a head to record reproduce data to/from each of the data tracks;

a seek mechanism to move the head between the data tracks; and a controller to control so as to access look-ahead data other than requested data for a predetermined period on the basis of the difference between data transfer rates of the data tracks when sequentially and alternately accessing the requested data in the data tracks wherein, the controller securing access time for the look-ahead data to the maximum limit in addition to access time for the requested data within an access time limit for each data track.

* * * * *